(No Model.) 2 Sheets—Sheet 2.
J. ESCH.
TRUCK.
No. 252,363. Patented Jan. 17, 1882.
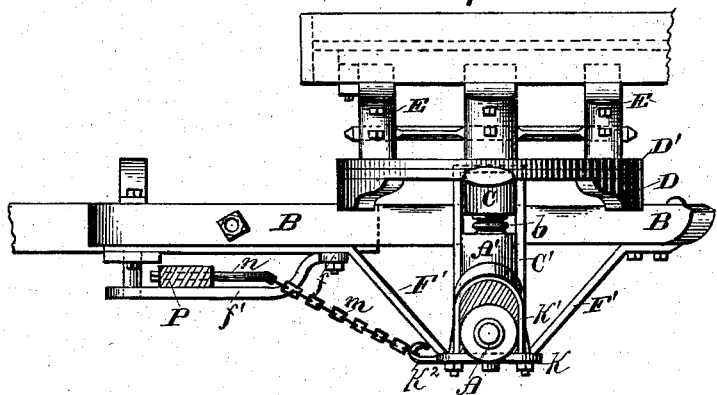
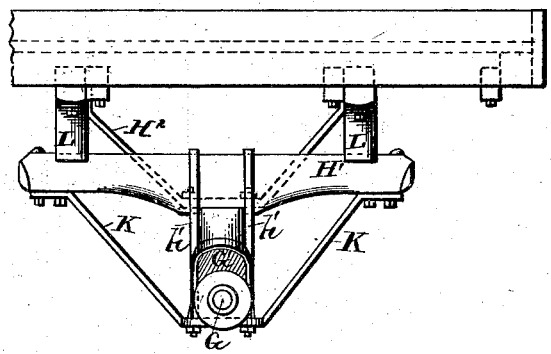
Witnesses:
E. G. Asmus
Henry Loverson
Inventor:
John Esch
By Stout & Underwood
Attorneys.

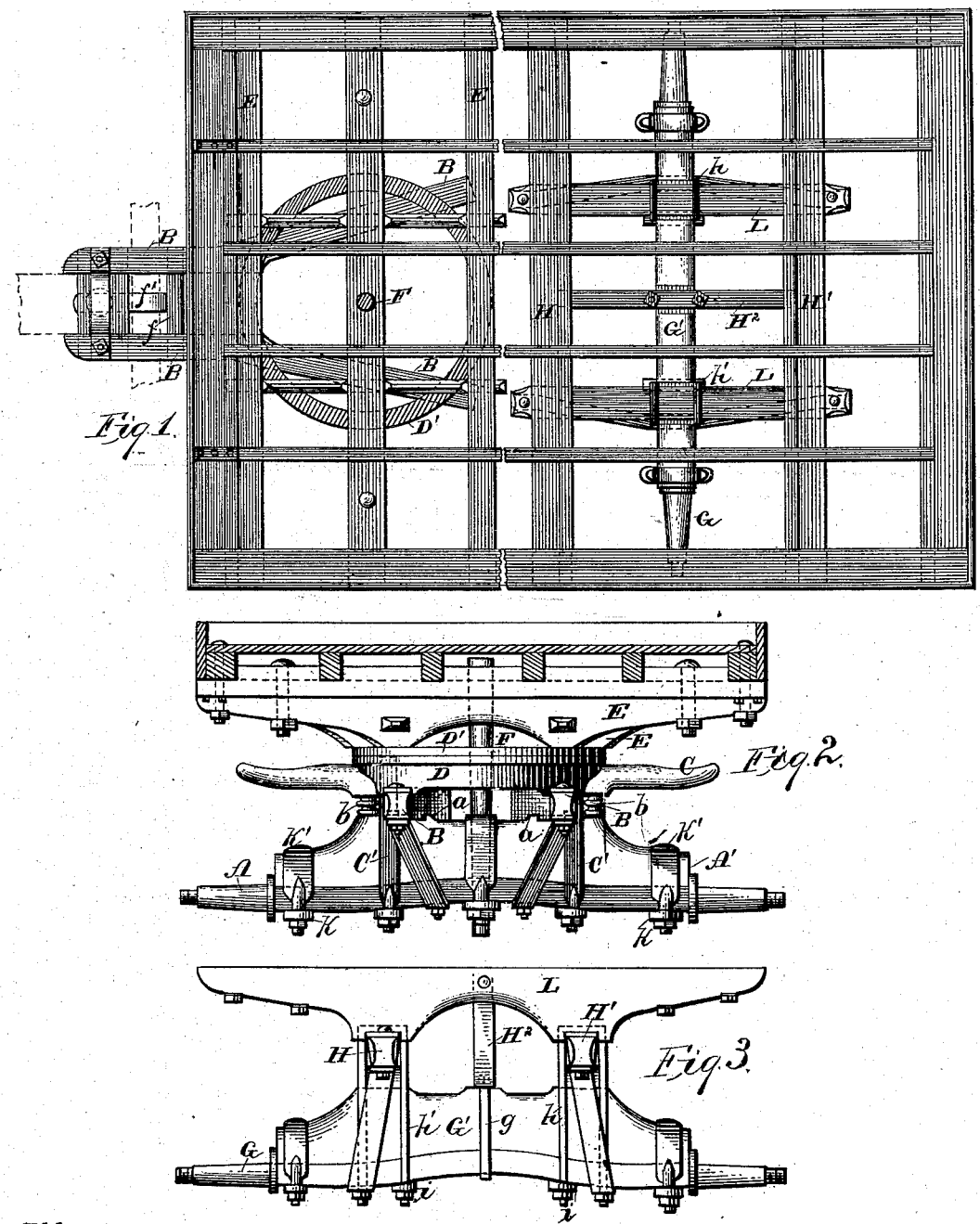

UNITED STATES PATENT OFFICE.

JOHN ESCH, OF MILWAUKEE, WISCONSIN.

TRUCK.

SPECIFICATION forming part of Letters Patent No. 252,363, dated January 17, 1882.

Application filed November 8, 1881. (No model.)

*To all whom it may concern:*

Be it known that I, JOHN ESCH, of Milwaukee, in the county of Milwaukee, and in the State of Wisconsin, have invented certain new and useful Improvements in Trucks or Heavy Wagons; and I do hereby declare that the following is a full, clear, and exact description thereof.

My invention relates to trucks or heavy wagons, and will be fully described hereinafter.

In the drawings, Figure 1 is a plan view of a wagon embodying my improvements, with the floor of the body removed. Fig. 2 is a rear view of its front gear. Fig. 3 is a like view of its rear gear. Fig. 4 is a side view of the front gear, and Fig. 5 is a like view of the rear gear.

A, Figs. 2 and 4, is the front axle, having the usual bolster, A', upon which the hounds B rest in grooves formed by the ridges a. Across the hounds B, I lay the sand-bar C, and then I secure the axle, bolster, hounds, and sand-bar together by straps C'.

The under side of the circle D is grooved in one direction to fit over the hounds B and in another direction to fit over the sand-bar C, and pillars b b are placed between the sand-bar and the upper side of the bolster to give additional strength to the ends of the sand-bar.

Trusses E E, securely bolted to the wagon-bed, carry the upper circle, D'; and a king-bolt, F, that passes down through the axle, furnishes a pivot about which the lower circle turns. To enable the hounds to sustain the great weight that is put upon them, I bolt a strap, F', to the rear end of each of the hounds, extend it under the axle and up under the front end of the same hound, to which I securely bolt it. By two of the bolts that serve to secure the straps F' to the front ends of the hounds I propose, further, to secure the cross-piece f of a T-bar, f', that is bent so as to leave a space between it and the hounds for a whiffletree, P, to rest in, and I propose to connect the whiffletrees with a plate, k, through which the lower ends of the straps pass, by hooks $k^2$, chain m, and staple n on each side, so that the draft will always be upon the axle, and as the whiffletree will have no pivotal point the strain will be borne equally by both animals. This feature I do not now claim, however, but reserve it as the subject of a future application.

The rear axle, G, is like the front axle in its general structure, having a wooden bolster, G', securely clipped to it, as shown in Fig. 3, and resting upon it are two trusses, H H, that are at right angles to the axle, and are tied by straps h h on one side and h' h' on the other. These straps pass down along each side of the axle, the inner arm of each pair h h' passing through a plate, i, which receives their holding-nuts, and the other arm through the lowest portion of a bracing-strap, K, that takes the place of the plate i, and the outer ends of which are bolted to and support the outer ends of the trusses H H.

The body is secured to the trusses H H by other trusses, L, that extend from one truss H to the other, and by a strap, $H^2$, preferably of wrought-iron, that is secured to the trusses L, near the floor of the wagon, and is bent down, as shown in Fig. 5, to rest upon bolster G' and at right angles to it, the two being secured together by a strap, g, that, passing under the axle, extends up through holes in the strap to receive nuts. (Shown in dotted lines, Fig. 5.)

What I claim as my invention, and desire to secure by Letters Patent, is—

1. In a truck or heavy wagon, the combination of the hounds, sand-bar, bolster, and axle with straps C' C' and F', and the lower circle grooved to fit over the hounds and sand-bar, as set forth.

2. The bolster A' and sand-bar C, in combination with supporting-pillars b, as set forth.

3. The combination of the axle, bolster, hounds, and circles of trusses E E, and king-bolt F, as set forth.

4. The combination, with rear axle and bolster, of trusses H H', securing-straps h h', bracing-straps K, and the trusses L, upon which the body rests, as set forth.

5. The combination of trusses L, strap $H^2$, and the bolster, as set forth.

In testimony that I claim the foregoing I have hereunto set my hand this 26th day of October, 1881.

JOHN ESCH.

Witnesses:
STANLEY S. STOUT,
HAROLD G. UNDERWOOD.